United States Patent Office 3,365,212
Patented Jan. 23, 1968

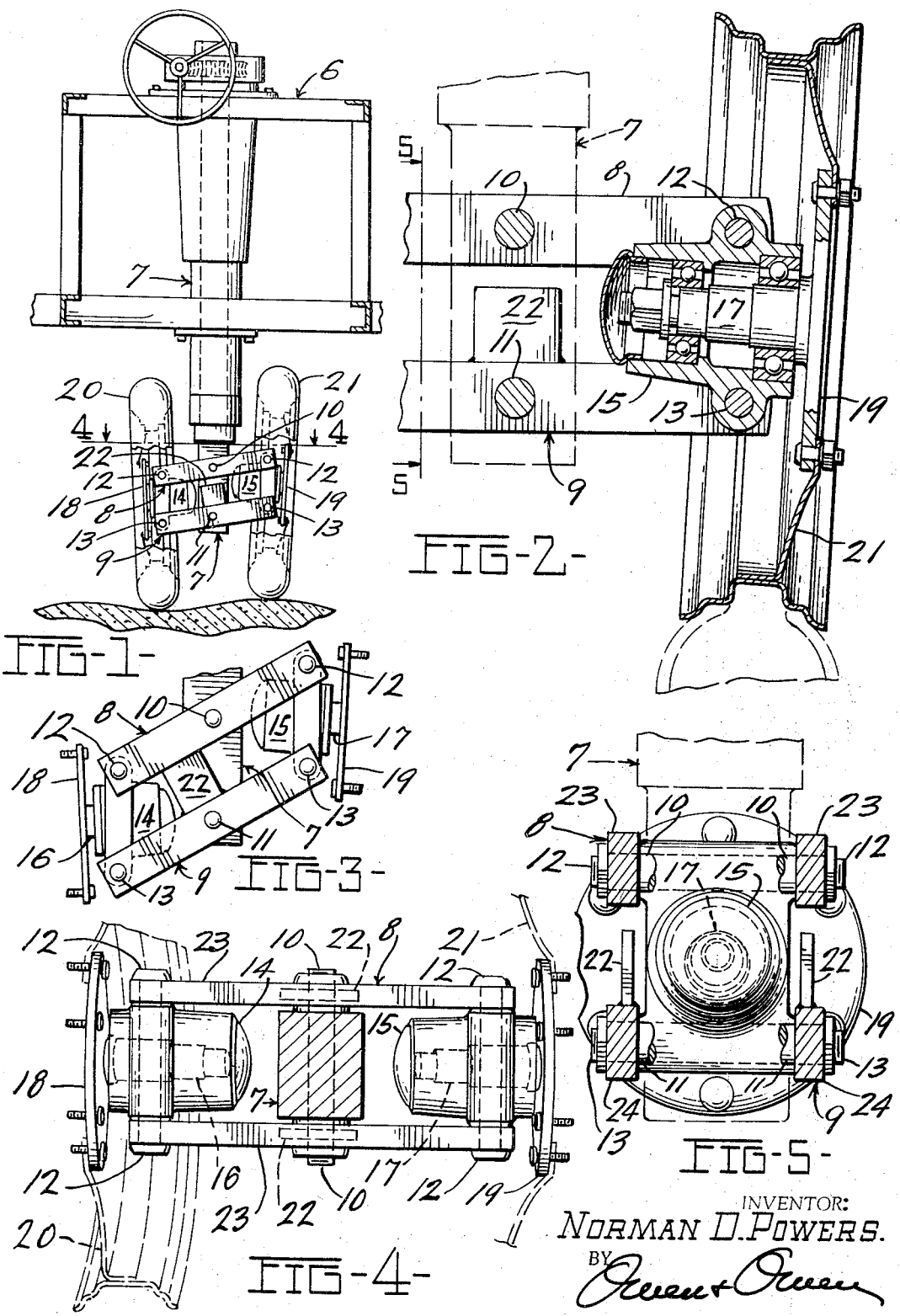

3,365,212
TRACTOR FRONT WHEEL MOUNTING
APPARATUS
Norman D. Powers, Rte. 1, Helena, Ohio 43435
Filed Mar. 17, 1966, Ser. No. 535,112
4 Claims. (Cl. 280—87)

This invention relates to improvements in mounting apparatus for supporting wheels of vehicles, and more particularly to apparatus for mounting closely spaced front wheels such as may be used on farm tractors.

Farm tractors of the row crop type generally have a widely spaced set of large rear wheels, and a relatively narrowly spaced set of small front wheels, or supporting wheels, which have a short turning radius. The small front wheels facilitate easy turning of the tractor in a small space at the ends of rows. Moreover, the main load on tractors is usually centered over the rear wheels, and large front wheels are not required for load support or traction.

In years past the front wheels on row crop tractors were mounted in closely spaced, transverse alignment upon rigid laterally extending spindles or axles affixed to vertically extending steering posts. With this method of wheel attachment when one of the wheels rode over a sharp rise or elevation in the ground, that wheel would tend to raise the other wheel off the ground whereby the entire weight of the front end of the tractor would be carried by one wheel, resulting in an uneven transverse stress being imposed on the steering post.

Numerous proposals have been made in the prior art to correct this problem with varying degrees of success. See, for examples, U.S. Patents Nos. 2,208,599, and 1,930,619. In general these methods consisted of mounting a movable differential apparatus on the steering post of the tractor which reversely translated, by means of appropriate parallel levers, an upward vertical and inward displacement of one wheel into a downward vertical and inward displacement of the other wheel, thus presumably allowing both wheels to be in contact with the ground at all times.

There are several disadvantages inherent in the apparatus used by the prior art. For example, in modern-day row crop tractors the front wheels usually are spaced apart horizontally only enough so as to provide clearance for the steering post to permit travel in the spaces between rows of crops. Using the parallel lever system of the prior art, where the ends of the levers are attached to outwardly extending wheel spindles, it has been found that the amount of vertical displacement which could be obtained by the wheels was severely limited if the normal, short horizontal wheel spacing requirements were to be met. That is, the outwardly extending wheel spindles add to the overall front wheel space dimensions and, inasmuch as the wheel spindles are of more or less constant dimension, a shorter horizontal front wheel space can be obtained only by shortening the length of the levers. The shorter the levers, the less vertical travel can be obtained by a wheel when it goes over a bump.

In addition, the width of the horizontal front wheel spacing is also limited by the space requirements of additional machines which are commonly mounted on the tractor. For example, it is impossible to mount a corn picker on a row crop tractor using the apparatus of the prior art with outwardly extending wheel spindles and spindle housings, as there is insufficient clearance between the picker and the wheel spindle housings or hubs. The advent of narrower crop rows also requires a minimum overall space between the front wheels. Shorter levers could be used to connect the wheels, but, as stated, vertical travel distance of the wheels would be sacrificed. Moreover, the system as taught by the prior art with the levers attached to outwardly extending spindles has poor load distribution characteristics on the front end resulting in an increased bearing load.

It is an object of this invention to provide an improved apparatus for mounting front wheels on vehicles, particularly farm tractors of the type discussed.

It is a further object of this invention to provide an improved wheel mounting apparatus for vehicles which has improved bearing load distribution characteristics.

It is a still further object of this invention to provide an improved wheel mounting apparatus which allows greater vertical travel of individual wheels without the necessity of increasing horizontal wheel space dimensions.

These and other objects of the invention will become clear from the following description when read in conjunction with the accompanying drawings in which:

FIG. 1 is a fragmentary view, partly in cross section and partly in elevation of the front portion of a tractor chassis, with a steering post mounted thereon and a wheel mounting apparatus embodying the invention attached to the lower end of the steering post;

FIG. 2 is a fragmentary vertical sectional view showing a portion of the steering post and the wheel mounting apparatus in greater detail and on an enlarged scale;

FIG. 3 is a fragmentary view in elevation showing a vertical stop block in operational use mounted on a lever;

FIG. 4 is a fragmentary, horizontal sectional view taken along the line 4—4 of FIG. 1, shown on an enlarged scale; and FIG. 5 is a fragmentary, vertical sectional view taken along the line 5—5 of FIG. 2.

In FIG. 1, a tractor chassis, generally indicated by the reference number 6, has a steering post 7 mounted on the front end in a generally vertical position. Attached at or near the bottom of the steering post 7 is the apparatus of the instant invention. This apparatus consists of vertically spaced, parallel levers 8 and 9, which are medially fulcrumed by pins 10 and 11 to the steering post 7 and which extend equidistantly laterally of both sides of the steering post 7. The levers 8 and 9 are also pivotably attached at their ends by pivot pins 12 and 13, respectively, to the upper and lower sides of inwardly extending, wheel spindle housings 14 and 15, each of which journals an inwardly extending wheel spindle 16 or 17, with the outer end thereof extending beyond the housing 14 or 15.

Wheel mounting means are attached on the outer ends of the spindles 16 and 17, plates 18 and 19 being illustrated, but any suitable attachment means may be used and wheels 20 and 21 are shown as mounted thereby.

As shown particularly in FIG. 3, stop blocks 22 may be mounted medially on the levers 8 or 9 in order to limit the extent of vertical travel of the wheels 20 and 21 to prevent the wheel spindle housings 14 and 15 from striking the steering post 7.

In a preferred embodiment of the invention, shown in FIGS. 4 and 5, each of the parallel levers 8 and 9 consists of two substantially identical elements 23 or 24, one element being pivotally mounted at the front face of the steering post 7 and one being pivotally mounted at the opposite or back face of the steering post 7. The wheel spindle housings 14 and 15 are mounted between the elements 23 or 24.

By attaching the parallel levers 8 and 9 to inwardly extending wheel spindle housings 14 and 15 levers of greater length can be used than have heretofore been possible without increasing the horizontal front wheel spacing dimensions. This allows a greater distance of vertical travel of an individual wheel 20 or 21 in order to traverse a bump or rise in the ground than has heretofore been possible. In addition, improved load distribution is obtained by attaching the levers 8 and 9 to the inwardly extending wheel spindle housings 14 and 15 rather than to outwardly extending wheel spindles as is done in the prior art.

In actual operation, when a wheel, for example the wheel 21, hits a rise in the ground, as is shown in FIG. 1, it rides along with the rise, elevating the wheel 21 on that side. At the same time, due to the pivoting mechanism of the levers 8 and 9, the opposite wheel 20 is lowered so that both wheels 20 and 21 are continuously in touch with the ground, insuring that the load distribution on each wheel remains substantially equivalent, thus substantially eliminating transverse stress.

The block 22 for limitation of vertical travel and wheel spindle housing protection can be placed on either the upper side of the lower lever 9 or the lower side of the upper lever 8.

While the apparatus of this invention has been described in conjunction with a row crop type tractor it can be appreciated that it will find ready application to other types of vehicles where it is customary or desirable to provide wheels in pairs on opposite lateral sides of the steering post in order to better distribute the load.

It is understood that suitable modifications of the mounting apparatus shown and described above can be made without departing from the scope of this invention as long as such modifications come within the scope and spirit of the appended claims.

What is claimed is:

1. In a vehicle having a turning post mounted for movement on a generally vertical axis, the improvement comprising vertically spaced, parallel levers, said levers being medially fulcrumed to said turning post, said levers extending equal distances laterally of both sides of said turning post, inwardly extending wheel spindle housings pivotally attached at the upper and lower sides thereof to the ends of said levers, inwardly extending wheel spindles journaled in said housings with the outer ends thereof extending beyond said housings, and wheel mounting means on the ends of said spindles.

2. A vehicle as described in claim 1 in which a stop block is mounted intermediate said parallel levers and medially attached to one of said levers for limiting the extent of vertical travel of said levers.

3. A vehicle as described in claim 1 in which the wheel mounting means consists of circular plates attached to the ends of said spindles.

4. A vehicle as described in claim 1 in which each of said levers consists of two elements mounted on opposite front and back faces of said turning post and said wheel spindle housings are mounted between said elements.

References Cited

UNITED STATES PATENTS

| | | | |
|---|---|---|---|
| 1,930,619 | 10/1933 | Jonkhoff | 280—124 |
| 2,208,599 | 7/1940 | Ronning | 280—87 |
| 2,336,814 | 12/1943 | Suter. | |
| 2,829,903 | 4/1958 | Ulinski. | |
| 2,933,327 | 4/1960 | Benson et al. | 280—87 |
| 3,262,715 | 7/1966 | Abbott | 280—111 X |

KENNETH H. BETTS, *Primary Examiner.*